(12) United States Patent
Takeuchi (10) Patent No.: US 7,440,184 B2
(45) Date of Patent: Oct. 21, 2008

(54) MICROSCOPE

(75) Inventor: Atsushi Takeuchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 212 days.

(21) Appl. No.: 11/386,112

(22) Filed: Mar. 22, 2006

(65) Prior Publication Data

US 2007/0041091 A1 Feb. 22, 2007

(30) Foreign Application Priority Data

Mar. 28, 2005 (JP) ............................. 2005-091541

(51) Int. Cl.
*G02B 21/06* (2006.01)
*G02B 21/00* (2006.01)

(52) U.S. Cl. ....................... 359/381; 359/368; 359/385; 359/388

(58) Field of Classification Search ......... 359/368–390, 359/738–740; 351/200–247
See application file for complete search history.

(56) References Cited

U.S. PATENT DOCUMENTS

| | | | | |
|---|---|---|---|---|
| 4,363,532 A | * | 12/1982 | Weber | 359/381 |
| 5,703,714 A | | 12/1997 | Kojima | 359/368 |
| 6,384,967 B1 | * | 5/2002 | Watanabe et al. | 359/385 |
| 6,657,781 B2 | * | 12/2003 | Murakami et al. | 359/381 |

FOREIGN PATENT DOCUMENTS

| | | |
|---|---|---|
| JP | A-08-211295 | 8/1996 |
| JP | A-2001-125002 | 5/2001 |

OTHER PUBLICATIONS

English Abstract of Japanese reference No. 8-211295.
English Abstract of Japanese reference No. 2001-125002.

* cited by examiner

*Primary Examiner*—Thong Nguyen
(74) *Attorney, Agent, or Firm*—Morgan, Lewis & Bockius LLP (57) ABSTRACT

A microscope according to the present invention includes an illumination element changer capable of selectively inserting any of a bright field illumination element, a dark field illumination element, and a fluorescence illumination element into an optical axis of an objective, a field stop disposed on the optical axis and limiting a visual field of the objective, an aperture stop disposed on the optical axis and limiting a pupil area of the objective, a filter member disposed on the optical axis and limiting a given ultraviolet wavelength range or adjusting a light quantity of illumination light of an illumination light source, a rotation shaft rotating in response to the changing movement of the illumination element changer, and an interlocking mechanism that brings the aperture stop, the field stop and the filter member into respective setting conditions corresponding to the selected illumination element in response to the rotation of the rotation shaft.

8 Claims, 9 Drawing Sheets

MICROSCOPE

This application claims the benefit of Japanese Patent Application No. 2005-091541 which is hereby incorporated by reference.

BACKGROUND OF THE INVENTION

1. Field of the Invention

The present invention relates to a microscope capable of changing an illumination device in accordance with an observation method.

2. Related Background Art

There has been proposed a conventional microscope capable of observing a metallic sample or a wafer with a bright field observation or a dark field observation by changing from a bright field illumination unit to a dark field illumination unit (see Japanese Patent Application Laid-Open No. 2001-125002).

There has been another microscope capable of making a fluorescence observation of a biological sample such as cells or the like with different excitation light corresponding to each observing sample by selecting a filter cube corresponding to each kind of the observing sample.

In an observing sample such as a high molecule compound, a biomaterial and a semiconductor device, a demand on carrying out a fluorescence observation as well as a bright field observation and a dark field observation has recently been increasing. In order to meet the demand, there have been carried out various methods such as replacing a bright field illumination unit or a dark field illumination unit with a fluorescence illumination unit, superposing a fluorescence illumination unit upon a bright field illumination unit or a dark field illumination unit, and attaching a filter cube for a bright field or a dark field to a fluorescence illumination unit.

However, replacing an illumination unit is a troublesome task, and superposing illumination units causes problems that sufficient optical performance cannot be obtained, or it becomes difficult to observe since the eyepiece position becomes high.

Moreover, since a fluorescence illumination optical system is basically different from a bright field illumination optical system or a dark field illumination optical system, even if a filter cube for a bright field or a dark field is attached to a fluorescence illumination unit, optical performance of the illumination unit cannot compete with that of an illumination unit designed exclusively for a bright field illumination or a dark field illumination. For example, in an illumination unit for a bright field illumination or a dark field illumination, a UV-blocking filter for blocking harmful ultraviolet rays is put on the optical axis, or a diffuser for removing unevenness of the light source is put on the optical axis. On the other hand, in a fluorescence illumination unit, ultraviolet rays used for excitation light are scarcely removed. On the contrary, since brightness is important, even a diffuser which may cause reduction in brightness is not put on the optical axis.

As described above, in order that all kinds of observation such as a bright field observation, a dark field observation and a fluorescence observation can be carried out by a single illumination unit, when a bright field observation or a dark field observation is carried out, a UV-blocking filter for blocking ultraviolet rays and a diffuser are necessary to be put on the optical axis, and when a fluorescence observation is carried out, the UV-blocking filter and the diffuser are necessary to be removed from the optical axis.

Moreover, while upon carrying out a dark field observation, an aperture stop and a field stop have to be fully opened, upon carrying out a bright field observation, diameters of the aperture stop and the field stop have to be adjusted to the selected objective lens and the illumination condition.

As described above, the operation to change the observation method is troublesome. In addition, when the operation is mistaken, not only an observation image similar to the one obtained upon using an exclusively designed illumination unit cannot be obtained but also there is a danger that harmful ultraviolet rays or flash light cannot be removed.

SUMMARY OF THE INVENTION

The present invention is made in view of the aforementioned problems, and has an object to provide a microscope capable of easily realizing an optimum illumination condition suitable for a selected observation method.

According to an aspect of the present invention, there is provided a microscope including, an illumination optical element changer that is capable of selectively inserting any of a bright field illumination optical element, a dark field illumination optical element, and a fluorescence illumination optical element into an optical axis of an objective lens, a field stop that is disposed on the optical axis and limits a visual field of the objective lens, an aperture stop that is disposed on the optical axis and limits a pupil area of the objective lens, a filter member that is disposed on the optical axis and limits a given ultraviolet wavelength range or adjusts a light quantity of illumination light of an illumination light source, a rotation shaft that rotates in response to the changing movement of the illumination optical element changer, and an interlocking means that brings the aperture stop, the field stop and the filter member into respective setting conditions corresponding to the selected illumination optical element in response to the rotation of the rotation shaft.

In the aspect of the present invention, it is preferable that the interlocking means includes a first gear that transmits torque of the rotation shaft upon inserting the dark field illumination optical element into the optical axis, and a link mechanism that operates together with the first gear and makes the field stop and the aperture stop fully open.

In the aspect of the present invention, it is preferable that the interlocking means includes a second gear that transmits torque of the rotation shaft upon inserting the fluorescence illumination optical element into the optical axis, and a cam mechanism that operates together with the second gear and removes the filter member from the optical axis.

In the aspect of the present invention, it is preferable that the first gear and the second gear are the same gear.

In the aspect of the present invention, it is preferable that the illumination optical element changer is a turret, and the rotation shaft rotates one turn every time when the illumination optical element is changed by rotating the turret.

In the aspect of the present invention, the microscope preferably includes a shutter that is disposed on the rotation shaft and blocks the illumination light upon changing the illumination optical element.

In the aspect of the present invention, the microscope preferably includes an electric motor that rotates the turret.

The present invention makes it possible to easily realize an optimum illumination condition suitable for a selected observation method.

DESCRIPTION OF THE MOST PREFERRED EMBODIMENTS

FIGS. 1(A) and 1(B) are schematic diagrams showing respectively, a cross sectional view of an illumination device for a microscope according to a first embodiment of the present invention and a side view of a microscope attached with the illumination device. FIG. 2 is a view seen along an arrow A in FIG. 1(A) in a state where a cover is removed.

The illumination device is for carrying out an epi-illumination (reflection illumination) and is stored in a housing 17A.

The illumination device is fixed to a microscope body 50 through a round dovetail joint 1 disposed on the lower surface of the housing 17A. On the upper surface of the housing 17A, an eyepiece tube 51 is fixed through a round dovetail joint 2. Upper portion of the housing 17A is covered by a cover 17B.

In the rear of the housing 17A, a mount 3 on which a light source such as a lamp house 52 is attached is disposed. On an optical axis L of the illumination light from the light source, there are disposed a relay lens 4a, a shutter 14, a relay lens 4b, a diffuser 15, a UV-blocking filter 16, an aperture stop 12, a field stop 13, a relay lens 4c and a semi-transparent mirror 5. In a lower direction of the semi-transparent mirror 5, an objective lens 53 and a sample are disposed.

The shutter 14 is held by a shutter holder 42, the relay lens 4b is held by a relay lens holder 38A, the diffuser 15 and the UV-blocking filter 16 are held by a filter holder 35, the aperture stop 12 is held by an aperture stop body 37, the field stop 13 is held by a field stop body 29, and the relay lens 4c is held by a relay lens holder 38B.

The illumination device is equipped with a turret 10 as an illumination optical element changer, the field stop 13, the aperture stop 12, the diffuser 15 and the UV-blocking filter 16 composing a filter member, a rotation shaft 22, a first gear 24, a link mechanism LM, a second gear 33 and a cam mechanism CM.

The first gear 24 and the link mechanism LM compose an interlocking means, and the second gear and the cam mechanism CM compose an interlocking means.

In order to adjust an illumination area on the sample, the field stop 13 is disposed on the optical axis L and limits the visual field of the objective lens.

In order to adjust contrast of the image, the aperture stop 12 is disposed on the optical axis L and limits a pupil area of the objective lens.

The UV-blocking filter 16 limits a given ultraviolet wavelength range of the illumination light. In order to remove unevenness in the illumination, the diffuser 15 blurs the light source image. In addition, the diffuser 15 and the UV-blocking filter 16 may be a single optical element by making a diffuser not transmitting ultraviolet rays as a filter member.

In the turret 10, a bright field cube 10A as a bright field illumination optical element, a dark field cube 10B as a dark field illumination optical element (see FIG. 3), and two fluorescence cubes 10C as fluorescence illumination optical elements (see FIG. 4) are disposed at the same intervals in a circumferential direction. Fixing portions of the bright field cube 10A, the dark field cube 10B, and the two fluorescence cubes 10C with respect to the turret 10 are predetermined, respectively. In FIG. 2, BF, DF, FL1 and FL2 indicate respective portions of the bright field cube 10A, the dark field cube 10B, and the two fluorescence cubes 10C. In order not to mix up the portions, the bright field cube 10A and the dark field cube 10B preferably have respective limit pins for preventing from mixing up the fixing portions. Instead of the bright field cube 10A and the dark field cube 10B, a semi-transparent mirror and a total reflection mirror may be respectively fixed to the turret 10.

Figure 1:
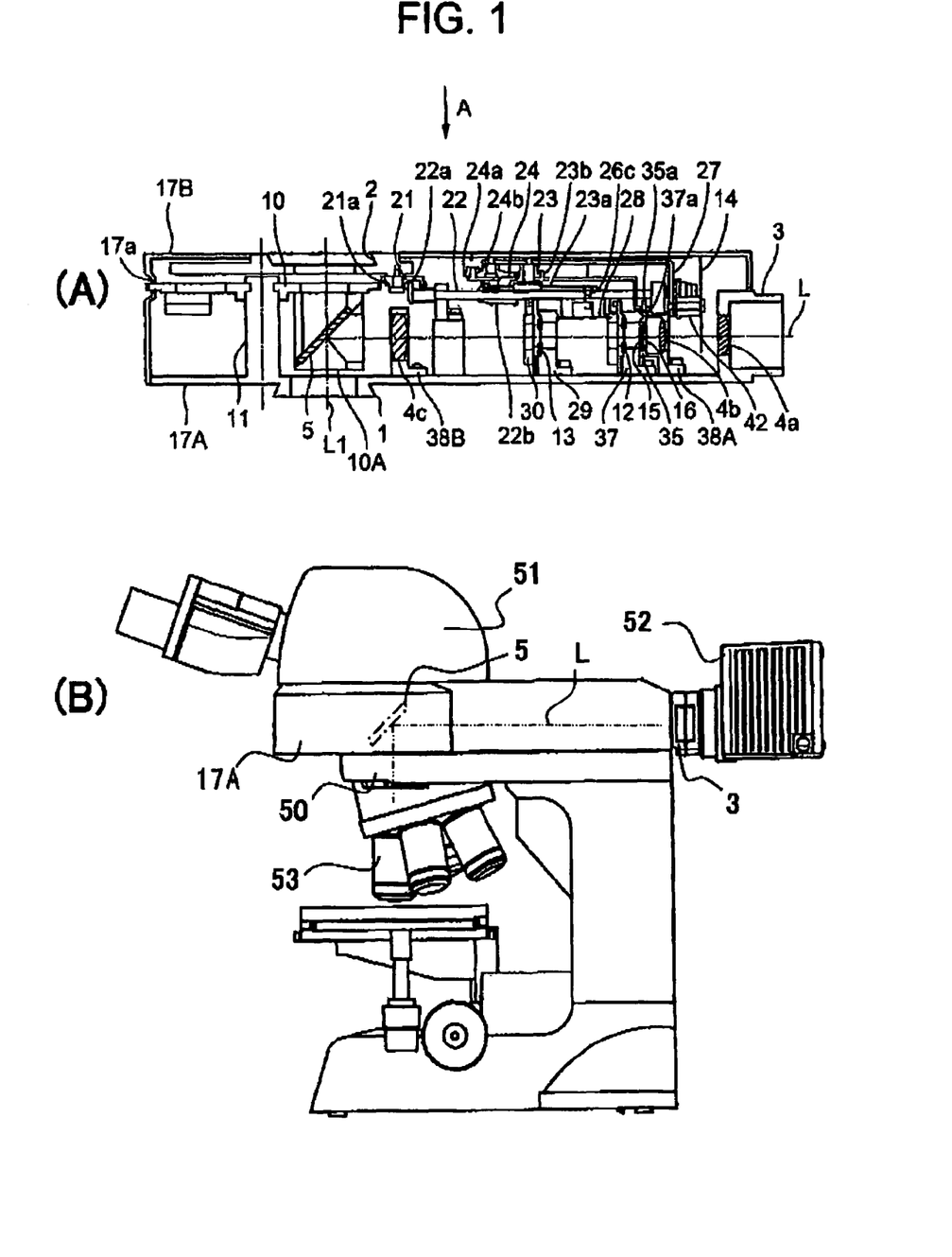
FIG. 1(A) is a schematic diagram showing a cross sectional view of an illumination device for a microscope according to a first embodiment of the present invention.
FIG. 1(B) is a schematic diagram showing a side view of a microscope attached with the illumination device according to a first embodiment of the present invention.
Figure 2:
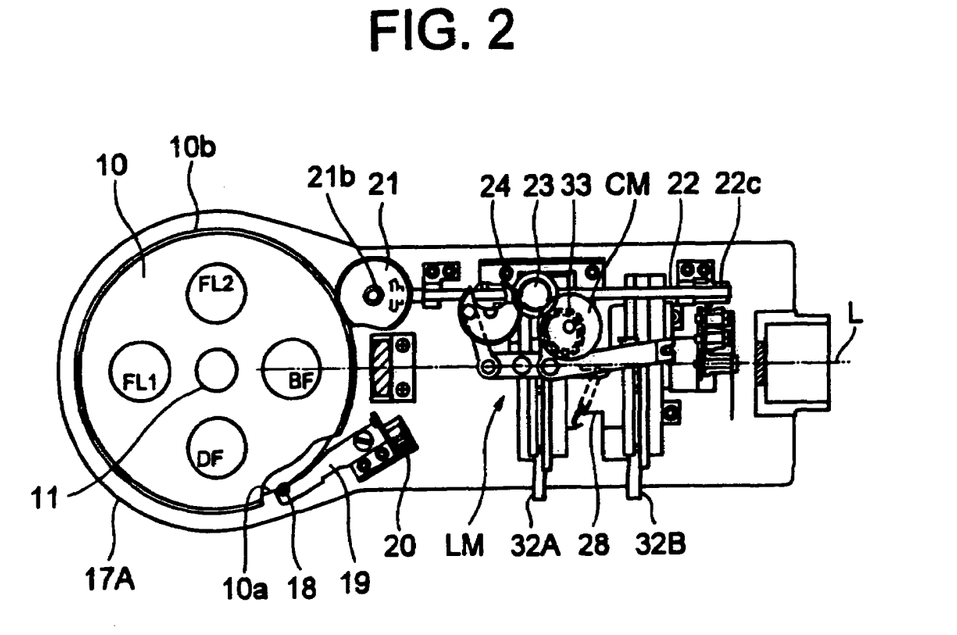
FIG. 2 is a view seen along an arrow A in FIG. 1 in a state where a cover is removed.

In the bright field cube 10A being used upon carrying out the bright field observation, a semi-transparent mirror 5 for reflecting light from the light source to the objective lens is fixed at an angle of 45 degrees with respect to the optical axis L (see FIG. 1).

The turret 10 can be rotated around a shaft 11. On the turret 10, click grooves 10a are formed. A click mechanism is composed of click grooves 10a, a bearing 18, an arm 19, a spring 20, and the like. With this click mechanism, the cubes 10A, 10B, and 10C can be selectively positioned on the observation optical axis L1.

On an outer circumference of the turret 10, a gear 10b as a knurling is formed. The gear 10b is meshed with a third gear 21. On an shaft 21b of the gear 21, a bevel gear 21a is disposed. The bevel gear 21a is meshed with a bevel gear 22a disposed on an end of the rotation shaft 22 extending along the longitudinal direction of the illumination device.

A portion of circumference of the gear 10b on the turret 10 is exposed from an opening 17a formed on the cover 17B in order to permit an observer to turn the turret 10 by his/her hand from outside of the illumination device. Moreover, the turret 10 may be electrically rotated by attaching an electric motor (not shown) to the shaft 21b.

Torque of the rotation shaft 22 is transferred to the aperture stop 12 and the field stop 13 through the first gear 24 and the link mechanism LM, and to the diffuser 15, the UV-blocking filter 16, the shutter 14 and the like through the second gear 33 and the cam mechanism CM, and moves them in accordance with the observation method. Accordingly, the first gear 24 and the link mechanism LM form an interlocking mechanism, and the second gear 33 and the cam mechanism CM form an interlocking mechanism.

Figure 3:
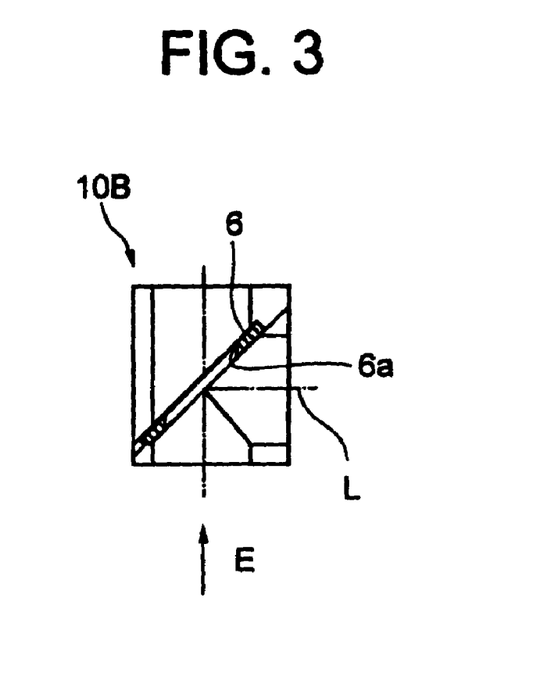
FIG. 3 is a cross sectional view of a dark field cube.

FIG. 3 is a cross sectional view of a dark field cube.

In the dark field cube 10B used upon carrying out a dark field observation, a mirror 6 is fixed at an angle of 45 degrees with respect to the optical axis L in order to reflect the light from the light source to the objective lens. A hole 6a having a substantially elliptical shape is formed at the center of the mirror 6 (see FIG. 3).

Figure 4:
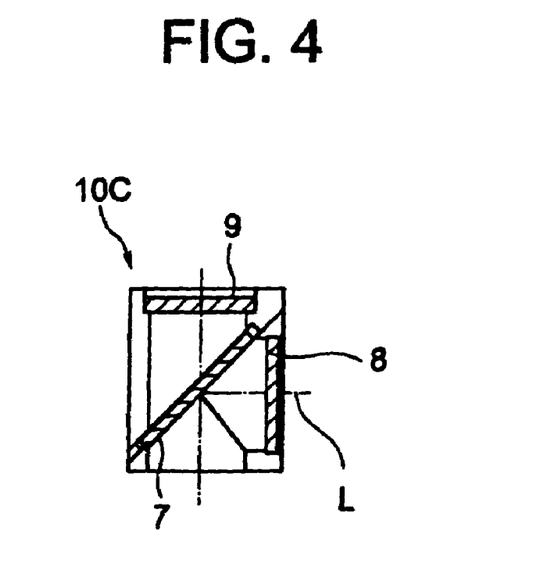
FIG. 4 is a cross sectional view of a fluorescence cube.

FIG. 4 is a cross sectional view of a fluorescence cube 10C. The fluorescence cube 10C used upon carrying out a fluorescence observation is composed of a dichroic mirror 7, an excitation filter 8 and a barrier filter 9 (see FIG. 4). In order to permit observation with various excitation wavelengths a plurality of fluorescence cubes 10C are provided.

Then, the link mechanism LM for operating the aperture stop 12 and the field stop 13 is explained.

Figure 5:
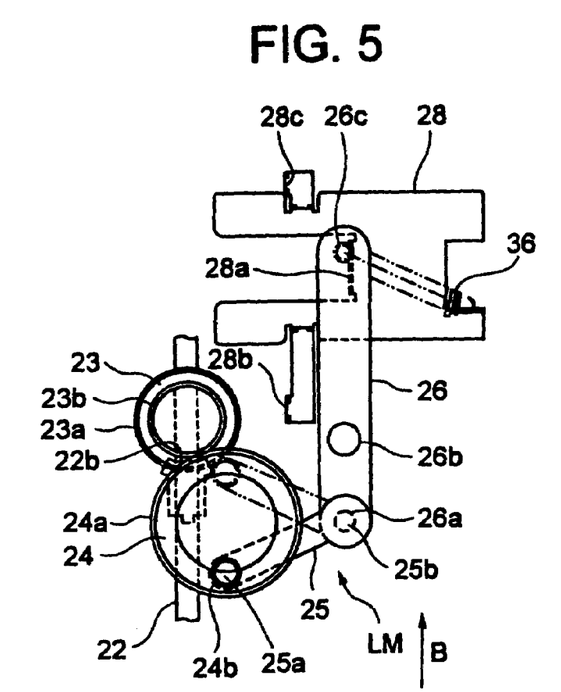
FIG. 5 is a plan view showing a link mechanism in a state upon carrying out a bright field observation or a fluorescence observation.
Figure 6:
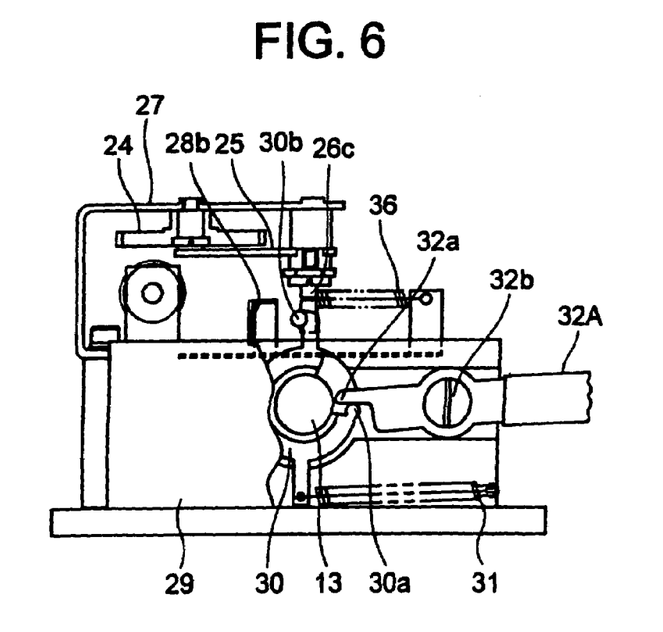
FIG. 6 is a view seen along an arrow B in FIG. 5.
Figure 7:
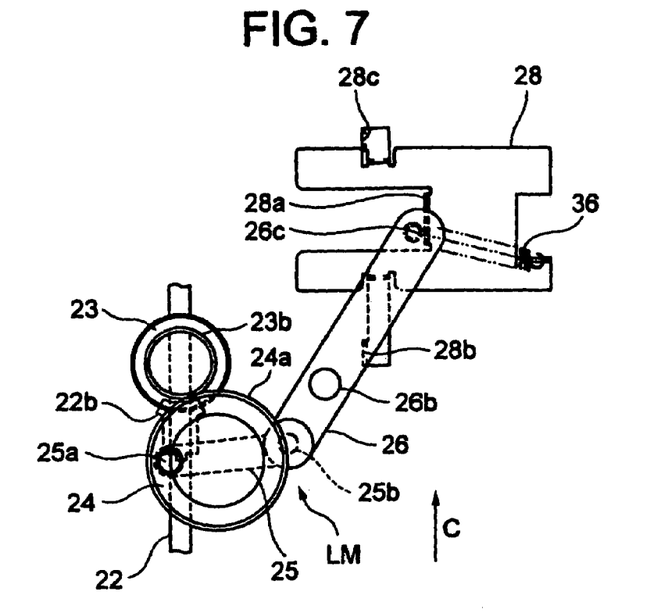
FIG. 7 is a plan view showing the link mechanism in a state upon carrying out a dark field observation.
Figure 8:
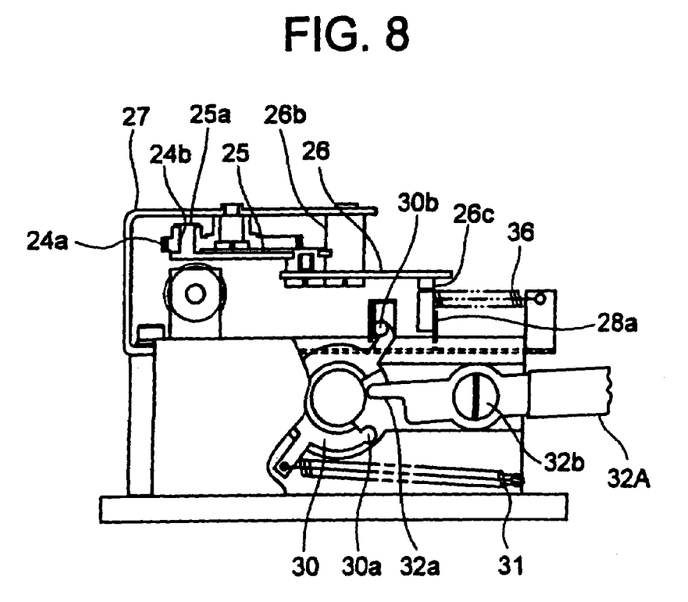
FIG. 8 is a view seen along an arrow C in FIG. 7.

FIG. 5 is a plan view showing the link mechanism LM in a state upon carrying out a bright field observation or a fluorescence observation. FIG. 6 is a view seen along an arrow B in FIG. 5. FIG. 7 is a plan view showing the link mechanism in a state upon carrying out a dark field observation. FIG. 8 is a view seen along an arrow C in FIG. 7. In FIG. 5, a fluorescence observation state is shown by a chain double-dashed line.

A bevel gear 22b is disposed at the central portion of the rotation shaft 22. A bevel gear 23a is meshed with the bevel gear 22b. The bevel gear 23a is held by a holding member 27 (see FIG. 1). A spur gear 23b disposed concentrically with the bevel gear 23a is meshed with a spur gear 24a of the first gear 24.

A hole 24b is formed on the first gear 24. A rotation shaft 25a disposed at an end of a first linking arm 25 is rotatably inserted into the hole 24b. A rotation shaft 25b disposed at the other end of the first lining arm 25 is rotatably inserted into a hole 26a disposed at an end of a second linking arm 26.

The second linking arm 26 is rotatable around a rotation shaft 26b. The rotation shaft 26b is held by the holding member 27 (see FIG. 1). A projection 26c is disposed at the other end of the second linking arm 26. The projection 26c is pressed against a contact plane 28a of an aperture opener 28 by a first spring 36.

The aperture opener 28 is held between the field stop body 29 and the aperture stop body 37 (see FIG. 1). The aperture opener 28 can be moved in the direction perpendicular to the surface of FIG. 1, in the direction up and down of FIG. 2, and in the direction right and left of FIGS. 5, 6, 7 and 8.

An aperture unit 30 is rotatably held by the field stop body 29.

The aperture unit 30 is pressed in a direction to close the field stop 13 (in a counterclockwise direction in FIG. 6) by a second spring 31.

The aperture unit 30 has a projection 30a which is able to contact with an end surface 32a of a lever 32A, and a projection 30b which is able to contact an end surface 28b of the aperture opener 28. The lever 32A is rotatable around a rotation shaft 32b. The other end of the lever 32A is projected outward of the housing 17A.

Then, the cam mechanism CM for inserting/removing the diffuser 15 and the UV-blocking filter 16 into/from the optical axis L is explained.

Figure 9:
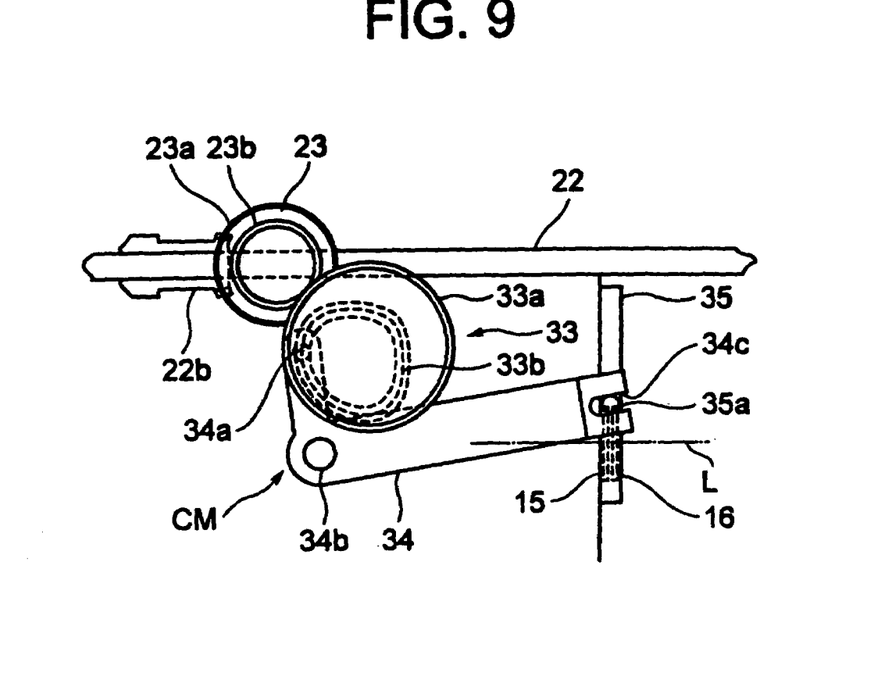
FIG. 9 is a plan view showing a cam mechanism in a state upon carrying out a bright field observation.
Figure 10:
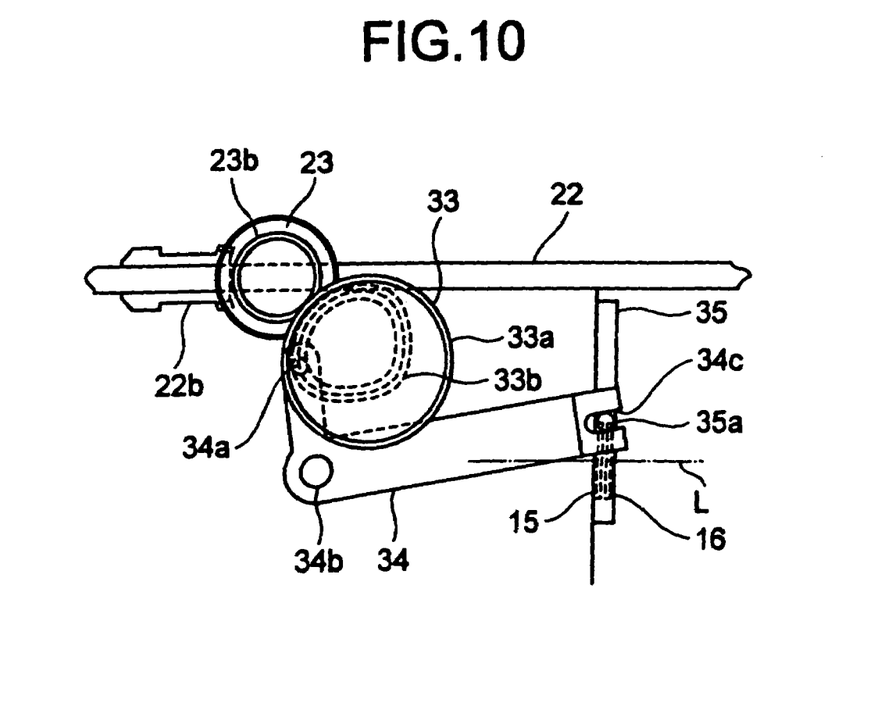
FIG. 10 is a plan view showing the cam mechanism in a state upon carrying out a dark field observation.
Figure 11:
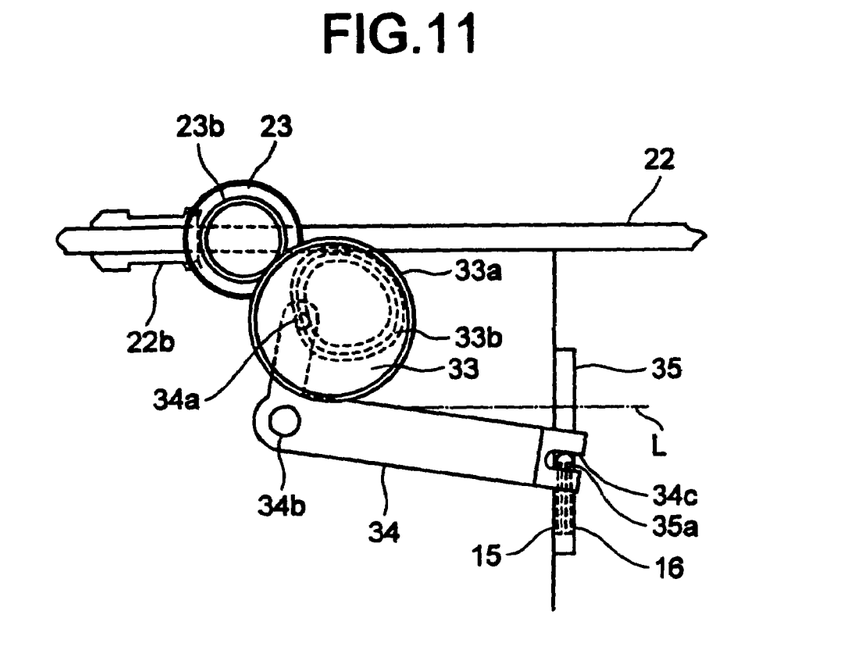
FIG. 11 is a plan view showing the cam mechanism in a state where a fluorescence cube 10C placed on a fixing portion FL1 of the turret is disposed on the optical axis.
Figure 12:
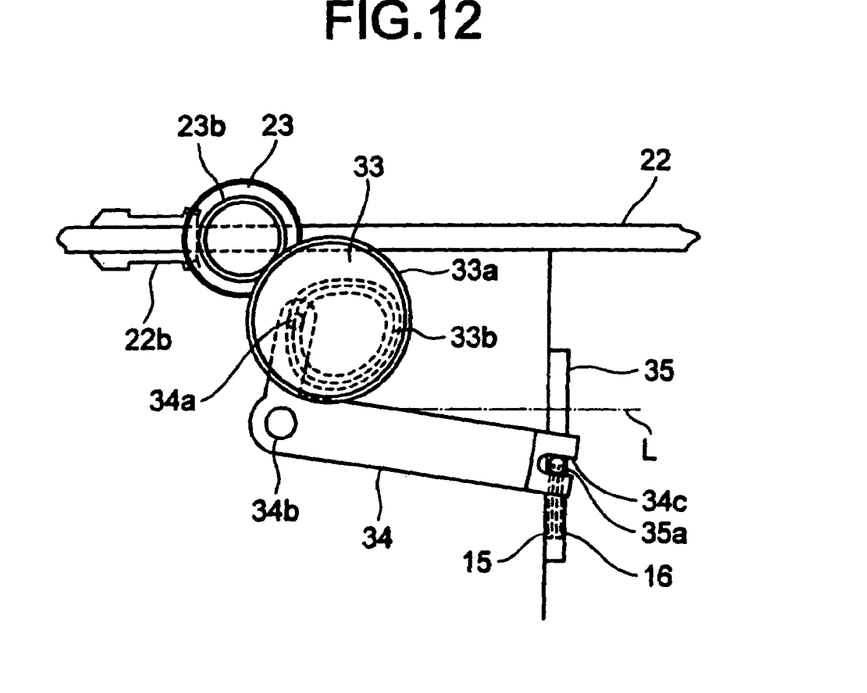
FIG. 12 is a plan view showing the cam mechanism in a state where a fluorescence cube 10C placed on a fixing portion FL2 of the turret is disposed on the optical axis.

FIG. 9 is a plan view showing a cam mechanism CM in a state upon carrying out a bright field observation. FIG. 10 is a plan view showing the cam mechanism CM in a state upon carrying out a dark field observation. FIG. 11 is a plan view showing the cam mechanism CM in a state where a fluorescence cube 10C placed on a fixing portion FL1 of the turret 10 is disposed on the optical axis. FIG. 12 is a plan view showing the cam mechanism CM in a state where a fluorescence cube 10C placed on a fixing portion FL2 of the turret 10 is disposed on the optical axis.

The bevel gear 23a is meshed with the bevel gear 22b disposed on the rotation shaft 22. The spur gear 23b disposed concentrically to the bevel gear 23a is meshed with a spur gear 33a formed on the second gear 33.

A cam groove 33b is formed on the second gear 33. A cam follower 34a disposed on an arm 34 is fitted in the cam groove 33b. The arm 34 can be rotated around a rotation shaft 34b. The rotation shaft 34b is held by the holding member 27 (see FIG. 1).

As described above, the diffuser 15 and the UV-blocking filter 16 are held by the filter holder 35. The filter holder 35 is disposed between the aperture stop body 37 and the relay lens holder 38A (see FIG. 1). The filter holder 35 can be moved along a rail 37a in a direction perpendicular to the surface of FIG. 1 and in a direction up and down in FIGS. 9 to 12.

A projection 35a is disposed upper portion of the filter holder 35, and the projection 35a is fitted in a groove 34c of the arm 34.

Then, the shutter 14 is explained.

In the epi-illumination (reflection illumination), when an observation method other than a dark field observation is changed to a dark field observation or when a dark field observation is changed to the other observations, there is a real danger that flash light enters the observation optical system.

Figure 13:
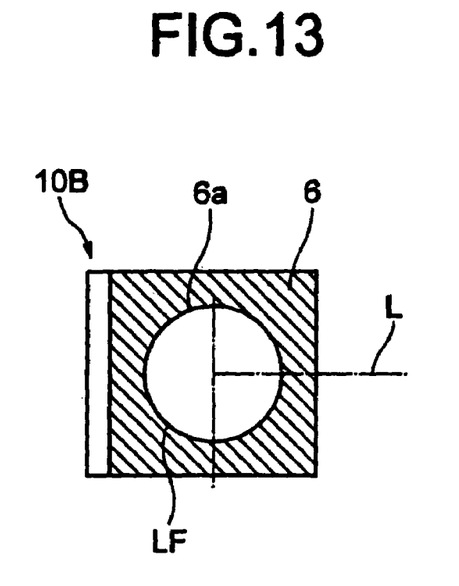
FIG. 13 is a view explaining the relation between a hole of the dark field cube and a bundle of rays at the time when the dark field observation is conducted.
Figure 14:
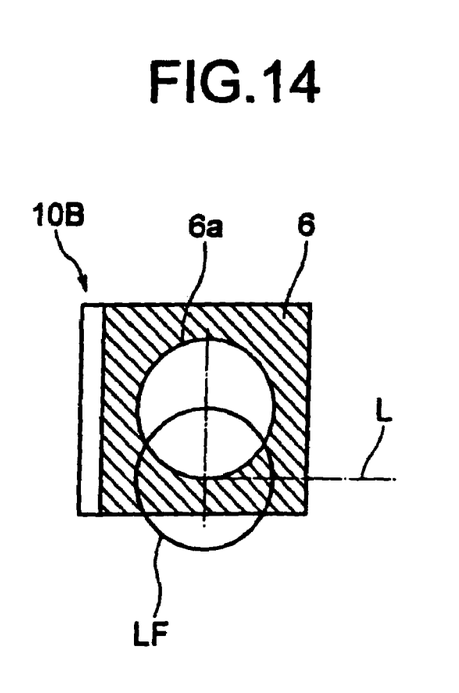
FIG. 14 is a view explaining the relation between a hole of the dark field cube and a bundle of rays on the way of changing the observation method from the dark field observation to any other observation.

FIGS. 13 and 14 are views explaining the relation between a hole of the dark field cube 10B and a bundle of rays. FIGS. 13 and 14 are views seen along an arrow E in FIG. 3.

The illumination light led by the mirror 6 along the illumination optical axis L is reflected only by the peripheral portion of the hole 6a, and only the light scattered by the sample is passed through the hole 6a of the mirror 6, and observed through an eyepiece (not shown). In this manner, since the dark field observation is carried out by detecting only the scattered light, the observation image is dark. Accordingly, in order to obtain a bright image as much as possible, a sample is irradiated by strong illumination light by such method that the aperture stop 12 is fully opened, or the like.

For example, when the dark field cube 10B is shifted by a small amount (see FIG. 14) in order to change the dark field observation to another observation, in the bundle of rays LF for forming the observation image, the mirror 6 and the hole 6a exist alongside each other. Accordingly, strong light directly enters in the bundle of rays LF by the mirror 6, so that flash light is incident into the visual field upon observing with only scattered light.

In order to prevent the flash light, the shutter 14 is driven by a drive mechanism shown below in the present embodiment.

Then, the drive mechanism of the shutter 14 is explained.

Figure 15:
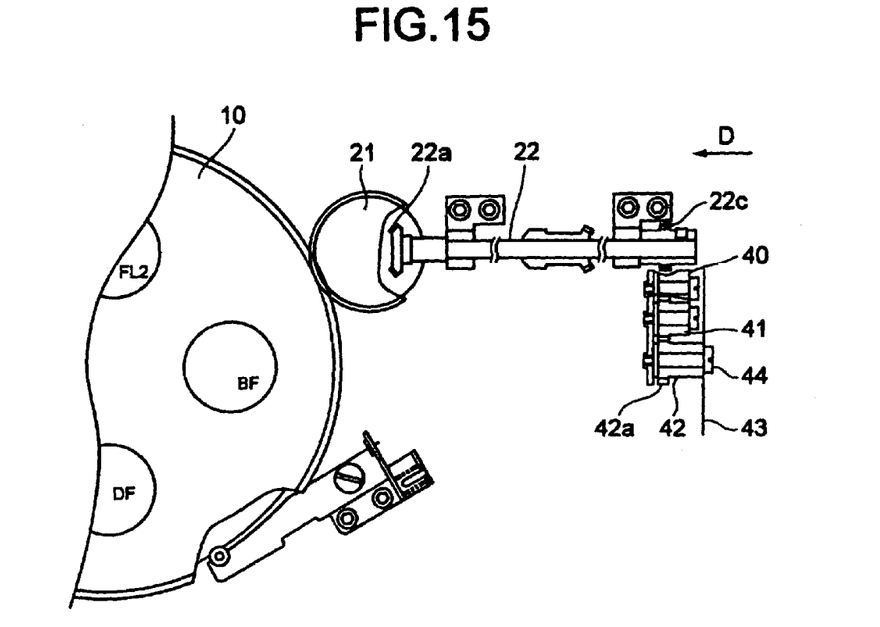
FIG. 15 is a plan view showing a drive mechanism of a shutter.
Figure 16:
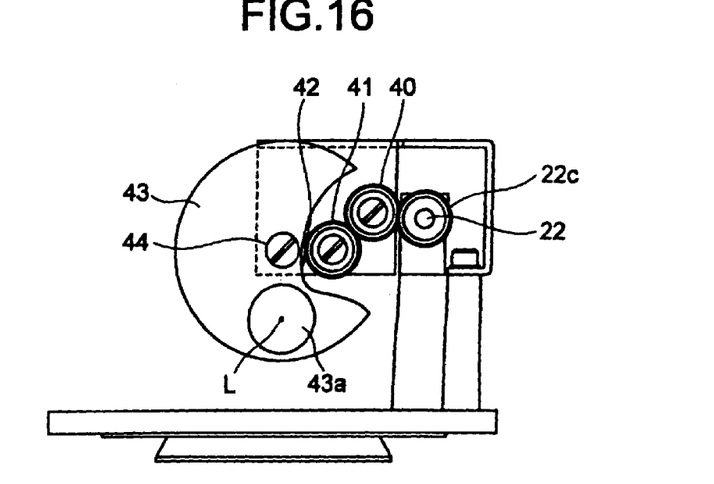
FIG. 16 is a view seen along an arrow D in FIG. 15.

FIG. 15 is a plan view showing a drive mechanism of a shutter. FIG. 16 is a view seen along an arrow D in FIG. 15.

A spur gear 22c is disposed at the other end of the rotation shaft 22. The spur gear 22c is meshed with an idle gear 40. The idle gear 40 is meshed with an idle gear 41. The idle gear 41 is meshed with a gear 42a of the shutter holder 42. A shutter 43 having a disk shape is attached to the shutter holder 42 by a screw 44. An aperture 43a having a circular shape is formed on the shutter 43. In FIG. 16, respective cubes 10A, 10B and 10C are arranged in right positions, and the aperture 43a is coincide with the illumination optical axis L.

An arrangement of optical elements such as the UV-blocking filter 16, the diffuser 15, and the like required for carrying out each observation method is explained.

Bright Field Observation:

1) In order to carry out the observation with an illumination wavelength, ultraviolet rays are necessary to be blocked out by inserting the UV-blocking filter 16 on the optical axis L.

2) In the observation method, since unevenness of the light source image is conspicuous, it is necessary that the light source image is blurred by inserting the diffuser 15 into the optical axis L.

3) Since the aperture stop 12 has to be adjusted in accordance with the kind of the objective lens to be used for the observation (in order to adjust contrast), it is necessary that the aperture stop 12 is in a state capable of being adjusted to any diameter.

4) The field stop 13 has to be adjusted to approximately the same diameter as the visual field of the observation.

Accordingly, when the bright field observation is carried out, it is necessary that the UV-blocking filter 16 and the diffuser 15 are firmly inserted to the optical axis L, and the aperture stop 12 and the field stop 13 are in a state capable of being adjusted.

Dark Field Observation:

1) In order to carry out the observation with an illumination wavelength, ultraviolet rays are necessary to be blocked out by inserting the UV-blocking filter 16 on the optical axis L.

2) In order to illuminate the sample uniformly, the diffuser 15 has to be inserted into the optical axis L.

3) The illumination light in the dark field observation does not illuminate the circular illumination area including the optical axis that is used upon carrying out the bright field observation. Instead, the outside of the circular area has to be illuminated, so that the aperture stop 12 and the field stop 13 have to be fully opened.

Accordingly, upon carrying out the dark field observation, it is necessary that the UV-blocking filter 16 and the diffuser 15 are firmly inserted into the optical axis L, and the aperture stop 12 and the field stop 13 is fully opened.

Fluorescence Observation:

1) Since there is a case that the ultraviolet rays have to be used as the excitation light, the UV-blocking filter 16 has to be removed from the optical axis L.

2) Since stronger illumination light has to be secured in view of efficiency of the illumination light, the diffuser 15 is preferably removed from the optical axis L. The fluorescence observation is an observation that fluorescence light comes out from the sample illuminated by the excitation light is observed, so that unevenness in the illumination caused by the light source image does not become a problem unlike the bright field observation.

3) In order to be able to adjust the intensity of the illumination light, the diameter of the aperture stop 12 is necessary to be adjustable.

4) In order to prevent from unnecessary fading of the sample, the diameter of the field stop 13 has to be adjustable to illuminate (excite) a minimal area to be observed.

Accordingly, upon carrying out the fluorescence observation, it is necessary that the UV-blocking filter 16 and the diffuser 15 are removed from the optical axis L, and the aperture stop 12 and the field stop 13 are adjustable.

Then, movements of the aperture stop 12 and the field stop 13 are explained below with reference to FIGS. 1, 2, 5, 6, 7 and 8.

Upon rotating the turret 10, the rotation shaft 22 is rotated through the gear 10b, the third gear 21, the bevel gear 21a and the bevel gear 22a. When the turret 10 rotates a quarter turn, the rotation shaft 22 rotates one turn.

When the rotation shaft 22 rotates, the first gear 24 rotates through the bevel gear 22b, the bevel gear 23a, the spur gear 23b and the spur gear 24a. When the rotation shaft 22 rotates one turn, the first gear 24 rotates a quarter turn. Accordingly, when the turret 10 is rotated a quarter turn in order to change the observation method, the first gear 24 is also rotated a quarter turn.

Then, by moving the other end of the lever 32A in the up and down direction causing rotation of the aperture unit 30, the observer carries out opening and closing the field stop 13.

As shown in FIGS. 5 and 6, upon carrying out the bright field observation or the fluorescence observation, since the end surface 28b of the aperture opener 28 does not contact with the aperture unit 30, the observer can adjust the field stop 13 to any diameter by the lever 32A.

As shown in FIGS. 7 and 8, upon carrying out the dark field observation, the aperture opener 28 is moved to the right side of the surface in FIGS. 7 and 8 by the link mechanism LM. The end surface 28b of the aperture opener 28 comes into contact with and presses the projection 30b of the aperture unit 30, and rotates the aperture unit 30 clockwise. Accordingly, the contact state between the end surface 32a of the lever 32A and the end surface 30a of the aperture unit 30, which defines the position of the aperture unit 30, is released. When the aperture unit 30 rotates up to the state shown in FIG. 8, the diameter of the field stop 13 becomes maximum. Accordingly, when the observer selects the dark field observation, the diameter of the field stop 13 becomes maximum regardless of the position of the lever 32A.

When the observation method is changed from the dark field observation to the other observation method, the contact state between the aperture opener 28 and the aperture unit 30 is released. Since the end surface 32a of the lever 32A comes into contact with the end surface 30a of the aperture unit 30, the position of the aperture unit 30 is defined again by the lever 32A.

The movement of the aperture stop 12 is similar to that of the field stop 13, so that the duplicated explanations are omitted. When the observer selects the dark field observation, the aperture opener 28 moves to the right side of the surface in FIG. 7. A projection (corresponding to the projection 30b of the aperture unit 30) of an aperture stop unit (not shown) is pressed by an end surface 28c, and the aperture stop 12 becomes a fully opened state. At this time, the diameter of the aperture stop 12 becomes maximum regardless of the position of a lever 32B (see FIG. 2).

Then, the movement of the diffuser 15 and the UV-blocking filter 16 is explained below with reference to FIGS. 1, 2, 9, 10, 11 and 12.

When the rotation shaft 22 is rotated, the second gear 33 is rotated through the bevel gear 22b, the bevel gear 23a, the spur gear 23b and the spur gear 33a. When the rotation shaft 22 rotates one turn, the second gear 33 rotates a quarter turn. Accordingly, when the turret 10 is rotated a quarter turn in order to change the observation method, the second gear 33 is also rotated a quarter turn.

Upon carrying out the bright field observation or the dark field observation, the arm 34 becomes the state shown in FIG. 9 or 10, and the UV-blocking filter 16 is inserted into the optical axis L.

Upon carrying out the fluorescence observation, the arm 34 becomes a state shown in FIG. 11 or 12, and the diffuser 15 and the UV-blocking filter 16 are removed from the optical axis L.

Then, the movement of the shutter 14 is explained below with reference to FIGS. 15 and 16.

When the turret 10 is rotated a quarter turn in order to change the observation method, the rotation shaft 22 is rotated one turn. The rotation of the rotation shaft 22 is transmitted to the gear 42a of the shutter holder 42 through the idle gears 40 and 41, and the shutter 43 is rotated. The rotation ratio of the rotation shaft 22 to the shutter 43 is the same as the ratio of the turret 10 to the rotation shaft 22 (which is 1:4). Accordingly, when the turret 10 is rotated 90 degrees, the shutter 43 is rotated one turn. Incidentally, the rotation ratio is not limited to this, and it is also possible that when the turret 10 is rotated 90 degrees, the shutter 43 may be rotated integral multiplication (except 0) turns.

Consequently, on the way of changing the observation method, the illumination light is blocked by the shutter 43, and the flash light is not incident on the observation optical system.

Moreover, a click groove (not shown) may be provided on the turret 10 between the two fluorescence cubes 10C, and it may be constructed such that the shutter 14 is closed at the position where the groove is. Accordingly, the sample can be prevented from fading.

According to the embodiment of the present invention, by carrying out only one movement to rotate the turret 10 in order to change the observation method, optical elements such as the UV-blocking filter 16, the diffuser 15, and the like necessary for the bright field observation, the dark field observation, or the fluorescence observation can be firmly inserted into the optical axis L without fail.

Furthermore, when the observation method is changed to the dark field observation, or from the dark field observation to the other observation method, the flash light is by no means incident upon the observer's eye.

In the above-described embodiment, although changing the observation method is carried out by the turret 10, it may be carried out such that by using, for example, a slide method instead of the turret 10, the linear movement is converted into rotational movement by a bevel gear and the like. In this manner, the similar effect as the above-described embodiment can be obtained.

Furthermore, by rotating the turret 10 with a single motor, all of the optical elements such as the UV-blocking filter 16, the diffuser 15, and the like can be set in an optimum condition for a selected observation method, so that the control becomes easy and manufacturing cost can be reduced.

What is claimed is:

1. In a microscope having an objective lens to be used commonly for a dark field observation, bright field observation and a fluorescence observation, the improvement comprising in combination:

an illumination optical element changer that is capable of selectively inserting any of a bright field illumination optical element, a dark field illumination optical element and a fluorescence illumination optical element into a optical axis of the objective lens;

a field stop that is disposed on the optical axis and limits a visual field of the objective lens;

an aperture stop that is disposed on the optical axis and limits a pupil area of the objective lens;

a filter member that is disposed on the optical axis and limits a given ultraviolet wavelength range or adjusts a light quantity of illumination light of an illumination light source;

a rotation shaft that rotates in response to the changing movement of the illumination optical element changer; and an interlocking means that brings the aperture stop, the field stop and the filter member into respective setting conditions corresponding to the selected illumination optical element in response to the rotation of the rotation shaft.

2. The microscope according to claim 1, wherein the interlocking means includes a first gear that transmits torque of the rotation shaft upon inserting the dark field illumination optical element into the optical axis, and a link mechanism that operates together with the first gear and makes the field stop and the aperture stop fully open.

3. The microscope according to claim 1 or 2, wherein the interlocking means includes a second gear that transmits torque of the rotation shaft upon inserting the fluorescence illumination optical element into the optical axis, and a cam mechanism that operates together with the second gear and remove the filter member from the optical axis.

4. The microscope according to claim 1 or 2, wherein the illumination optical element changer is a turret, and the rotation shaft rotates one turn every time when the illumination optical element is changed by rotating the turret.

5. The microscope according to claim 1 or 2, further comprising:

a shutter that is disposed on the rotation shaft and blocks the illumination light upon changing the illumination optical element.

6. An illumination device capable of being attached to a microscope body having an objective lens to be used commonly for a dark field observation, bright field observation and a fluorescence observation, comprising:

a filter member that is disposed on an optical axis of the an objective lens of the microscope body and limits a given wavelength range or adjusts a light amount among the illumination light from an illumination light source;

an aperture stop that is disposed in front of the filter member and limits a pupil area of the objective lens;

a field stop that is disposed in front of the aperture stop and limits a visual field area of the objective lens;

an illumination optical element changer that includes a first fixing portion on which a bright field illumination optical element is disposed, a second fixing portion on which a dark field illumination optical element is disposed, and a third fixing portion on which a fluorescence illumination optical element is disposed, and is capable of selectively inserting any of the illumination optical element onto the optical axis of the objective lens; and an interlocking means that mechanically connects the field stop, the aperture stop and the filter member to the illumination optical element changer, and when the second fixing fixing portion on which a dark field illumination optical element is disposed is set on the optical axis, removes restriction on the field stop and the aperture stop applied by an externally operable lever and sets the stops to respective maximum diameters in response to the operation of the illumination optical element changer.

7. The illumination device according to claim 6, wherein a limit pin for preventing from erroneously attaching the illumination optical element is disposed on the first fixing portion and the second fixing portion of the illumination optical element changer.

8. The illumination device according to claim 6, wherein when either the first fixing portion on which a bright field illumination optical element is disposed or the third fixing portion on which a fluorescence illumination optical element is disposed is set on the optical axis, the aperture stop and the field stop are made to be freely adjustable by the externally operable lever.

* * * * *